H. S. BECKMAN.
CAMERA ACTUATING MECHANISM.
APPLICATION FILED FEB. 8, 1918.
1,301,358.
Patented Apr. 22, 1919.
2 SHEETS—SHEET 1.
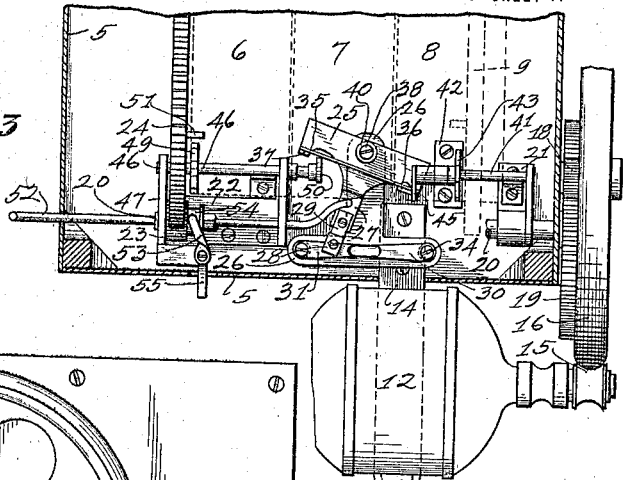
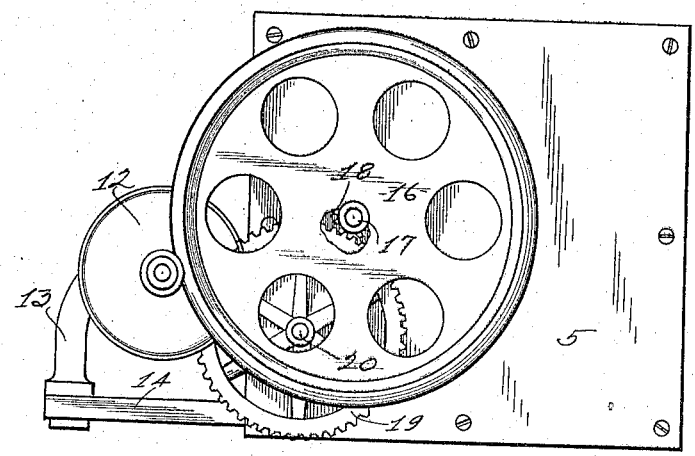
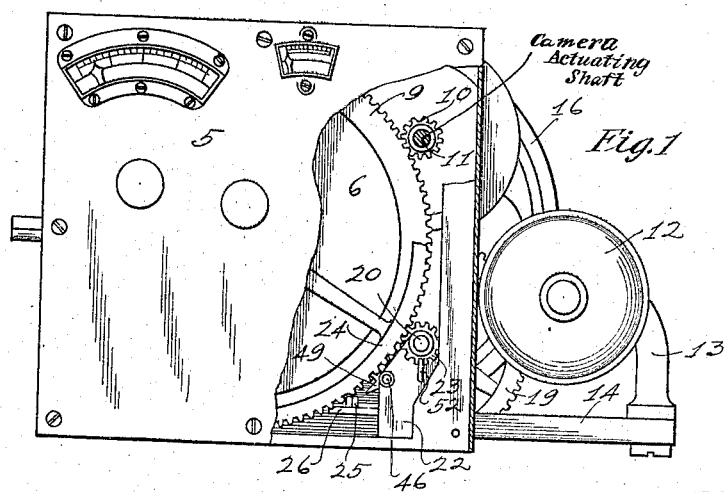
INVENTOR.
Herbert S. Beckman,
BY
Mack & Litzenberg
ATTORNEY.

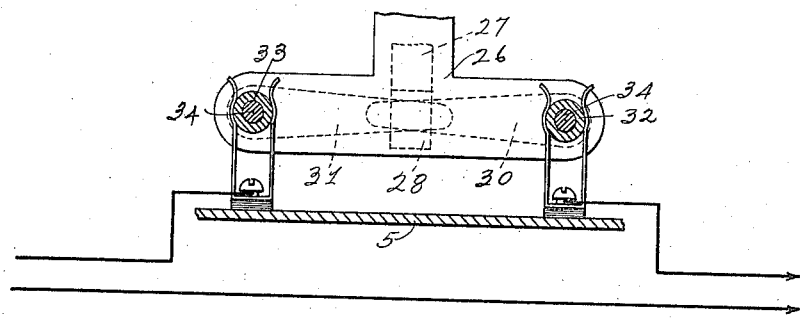
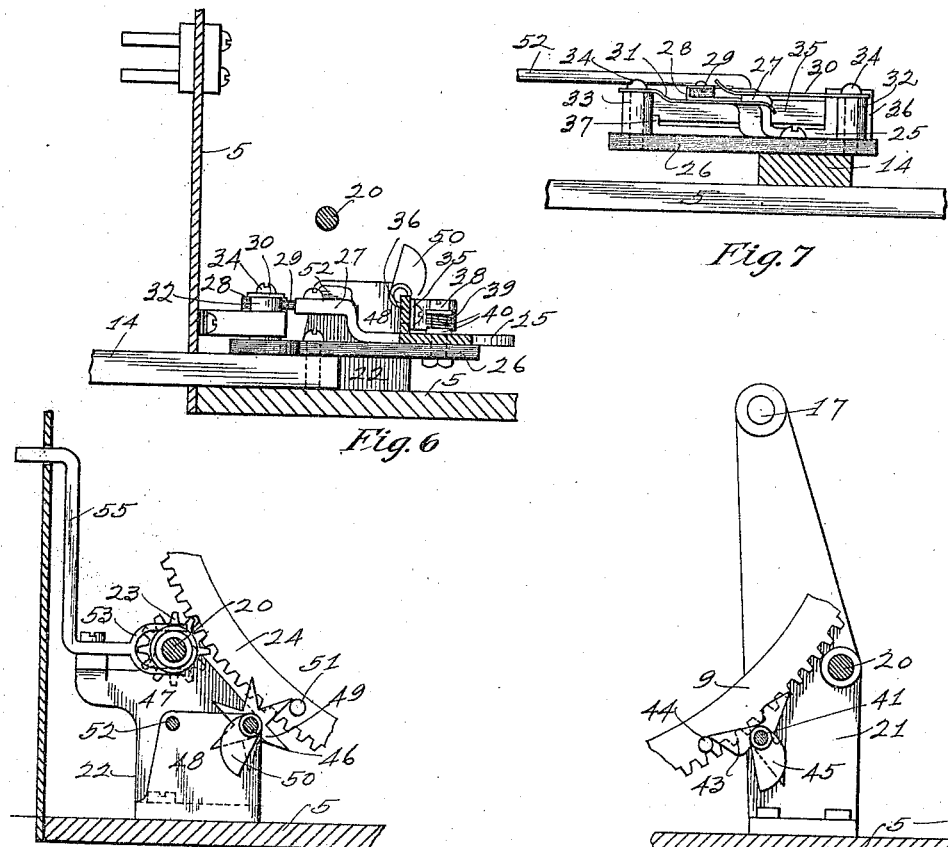

UNITED STATES PATENT OFFICE.

HERBERT S. BECKMAN, OF LOS ANGELES, CALIFORNIA.

CAMERA-ACTUATING MECHANISM.

1,301,358.  Specification of Letters Patent.  Patented Apr. 22, 1919.

Application filed February 8, 1918. Serial No. 216,384.

*To all whom it may concern:*

Be it known that I, HERBERT S. BECKMAN, a citizen of the United States, residing at Los Angeles, in the county of Los Angeles and State of California, have invented certain new and useful Improvements in Camera - Actuating Mechanisms, of which the following is a specification.

My invention relates to improvements in mechanism for actuating motion picture cameras and has particular reference to that type of device shown in a former invention of my own, filed August 17, 1917, Serial Number 187,718, the primary object of the present invention being to provide automatic means for operating motion picture cameras and rendering the same capable of continuous operation for an indefinite period, thus lending a maximum efficiency to such a device and not in any manner limiting the length of a single film which may be subjected to exposure in the camera.

A further object is to provide in such a device, means whereby power is communicated to the camera by a set of tandem springs housed in drums within a suitable case or housing, together with means self contained in and supported on said case for rewinding said springs intermittently, after predetermined periods, and thus rendering the device incapable of being completely unwound under normal conditions.

A further object is to provide a spring motor for actuating the camera and an electric motor commonly supported therewith for re-winding the springs of said motor, said means including a switch capable of automatic operation by the rotation of the spring drums whereby the electric winding motor may be intermittently energized and deënergized when the tension of the springs has been exhausted to a predetermined point.

A further object is to provide a winding device having means associated therewith capable of intermittently winding the springs at a greater speed than the same may at any time, under normal conditions, be unwound by the action of the camera.

Other objects will appear as the description progresses.

I have shown a preferred embodiment of my present invention in the accompanying drawings, in which similar reference characters are employed for indicating the same and like parts. In said drawings, Figure 1 is a front end elevation of the camera actuating motor, partly in section;

Fig. 2 is a rear end elevation thereof;

Fig. 3 is a partial plan view of the same;

Fig. 4 is an enlarged transverse sectional elevation of a portion of the motor case showing the automatic switch device for stopping the operation of the winding motor;

Fig. 5 is a similar view of the opposite end of the case showing the automatic switch device for starting the operation of the winding motor;

Fig. 6 is a sectional elevation of a portion of the case intermediate of Figs. 4 and 5, showing the primary motor switch adapted to be actuated by the mechanism shown in Figs. 4 and 5;

Fig. 7 is a section showing a front elevation of the switch shown in Fig. 6.

Fig. 8 is a sectional plan and wiring diagram of the electric switch for regulating the winding mechanism.

In the consideration of this invention particular reference is had to my former application for patent hereinbefore identified and referred to, the details of which have been omitted from this application and only a sufficient number of the parts employed in said former application being herein shown for identifying the old and properly associating the new improvements for a complete disclosure of my invention.

Referring particularly to Figs. 1, 2 and 3, 5 is a case or housing in which a trio of drums 6, 7 and 8 are suitably mounted and are provided with tandem springs (not shown), the outer end of the spring in drum 6 being secured to the periphery thereof and the inner end to the extended hub of the drum 7, while the spring in drum 7 is likewise connected at opposite ends to the periphery of this drum and the hub of drum 8. The other spring is attached at opposite ends to the periphery of drum 8 and the drum shaft, as usual, in tandem spring motors. Drum 8 has a gear 9 formed on or attached thereto, of large diameter for imparting motion to a driven pinion 10 mounted on a longitudinal shaft 11. This shaft, as clearly shown in my former application for patent serves to actuate the motion picture camera.

An electric motor 12 is adjustably supported by means of a stem 13 on a bar or bracket 14 secured to and extending outwardly from the floor of the case 5, and a pulley 15 on the shaft of this motor is adapted to frictionally engage and rotate a relatively large fly wheel or pulley 16, suitably mounted on a shaft 17, exterior of the case 5 and carrying a small pinion gear 18 adjacent to the wall of the case.

Pinion 18 meshes with and drives a relatively larger gear 19 carried by a longitudinal shaft 20, which is journaled in suitable bearings in brackets 21 and 22 at opposite ends of the case and interior thereof, said brackets being secured to the floor of the case, as shown. Near the front end of the case, the shaft 20 is provided with a small pinion 23, which is slidably held on the shaft and adapted to mesh with and drive a large gear 24 commonly mounted with the drums 6, 7 and 8 and attached to one end of the tandem spring device. Thus when the electric motor is started operating motion will be communicated to the winding gear 24 by means of the friction and spur gearing described and shaft 20, for placing tension on the springs within the drums.

When the camera actuating means is in operation, the speed at which the spring motor unwinds will depend upon the operating speed of the camera, and as the camera speed is designed to be changed to produce different picture effects, that is to speed up and slow down the motion of the picture, it is necessary to provide for regulating the winding device of my invention a switch by means of which the electric motor may be energized at certain times when the tension of the tandem springs reaches a certain point, in order that the springs may not entirely unwind and thus stop the action of the camera. It has been found practicable and desirable to so time the winding means that when the camera is operating at a maximum speed, the winding of the springs may be accomplished at a speed in excess of the maximum speed of the camera, or, in other words, under the most unfavorable conditions, to provide means whereby a greater amount of tension may be placed on the springs than will be exhausted when the camera is operating at a maximum speed.

For the above purpose it is necessary to provide a switch capable of being operated to close the electric winding motor circuit after a certain amount of tension has been exhausted and of being again operated to open the circuit of the motor after a maximum tension has been placed on said springs.

For instance, in the device shown, the tension of the springs being substantially relative to the number of turns of the spring on their stems, I have provided means, whereby, when three turns of the driving gear 9 have been accomplished a switch 25 may be operated to close the circuit of the electric motor; and thereafter when six turns of the winding gear 24 have been accomplished said circuit will again be opened, the tendency being to constantly overwind the springs, but, as the tension of the springs is being constantly decreased, such a result can rarely occur. In such event, however, the pulleys 15 and 16 of the winding gearing would slip until the condition could be manually corrected. This mechanism I will now describe.

Switch 25 is pivotally supported on an insulating base 26 suitably secured to the floor of the case 5 and comprises a base portion 25 and a right angularly extending arm 27, which arm has secured thereto a wiper contact 28 held on the arm by means of an insulating block 29. A pair of brushes 30 and 31 are supported on the insulating base 26 on opposite sides of the center of switch 25 and are held on the tops of terminals 32 and 33, respectively, by means of screws 34, 34. These brushes are normally spaced apart so as to open the circuit and the arm 27 of switch 25 is adapted to be moved as hereinafter described, into and from contact with the said brushes for closing and opening the circuit, the wiper 28 being moved into position between the brushes, as shown, and thus bridging the gap between the brushes.

The base portion of switch 25 is extended at right angles to arm 27 and a flat spring 35 is attached to an upturned lip 36 on one end thereof and extends the full length of the base and rests normally against a shorter lip 37 on the opposite end. The switch base is resiliently held on the insulating member 26 by means of a screw 38 and a spring 39 compresses between washers 40 on the screw.

A relatively short and small shaft 41 is journaled in a bearing on bracket 21 at one end and in a bracket 42 at the other end and parallels the shaft 20. This shaft carries a three point star wheel, or ratchet, 43 which is adapted to be engaged once in every revolution of the driving gear 9 by a pin 44 secured to and extending outwardly from said gear. A cam 45 is attached to the inner end of shaft 41 and is adapted to engage the lip 36 on switch 25 simultaneously with the completion of the third revolution of the gear 9 and the third intermittent movement of the star wheel 43, and this movement of the switch serves to move the arm 27 thereof into position between the brushes 30 and 31, thus closing the circuit of the electric winding motor.

The operation of the winding motor rotates shaft 20 and winding gear 24 through the connections described. A shaft 46 is supported in bearings 47 and 48 of brackets 22 and carries a six point star wheel 49 at a point near gear 24 and a cam 50 at a point adjacent to the switch base 25. When the winding operation is begun as stated, such action will continue until the gear 24 will have completed six complete revolutions and the star wheel 49, which is adapted to be turned one sixth of a revolution at each turn of the gear, by means of a pin 51 on said gear, whereupon the star wheel 49 in its last movement will turn shaft 46 and cam 50 thereon a sixth of a revolution and thus move the switch 25 by means of the engagement of the cam 50 with the flat side of the spring 35. This last described movement will open the switch and stop the winding motor unless and until three more turns of gear 9 shall have been accomplished and in such event, the switch will again be closed for further winding of the springs.

It will be understood that at times the gears 9 and 24 will rotate almost if not quite synchronously, and always in the same direction whether winding or unwinding of the springs is taking place. For this reason, it will be possible for the cams 45 and 50 to simultaneously engage the opposite ends of the switch 25, but in such event, the flat spring 35 will yield sufficiently to permit the cams to pass the switch and no trouble will ensue.

In the event that the spring motor may be completely unwound at the beginning of a photographing operation, for any reason or cause, I provide a manually operable rod 52 which is slidably supported in bracket 22 and is pivotally attached at its inner end to the switch arm 27, as shown, the outer end thereof being extended and upturned for convenience in operation.

The pinion 23 which serves to drive the winding gear 24 may be moved longitudinally of shaft 20 by means of a yoke 53 which is adapted to engage an annular groove 54 in the pinion hub. The yoke has an upward and outward extension or handle 55, by means of which the yoke may be operated for moving the pinion into and out of mesh with gear 24 and the yoke is pivotally supported on an extension 56 of bracket 22, as shown.

In the form of case shown in the present and former invention, the sides and ends are removable and any suitable means may be employed for connecting the brushes 30 and 31 with the motor circuit. Ordinary lighting plugs and sockets may be attached to the sides of the case and connected by means of wires with the brush terminals.

I do not desire to limit my invention to the specific elements shown and described for I conceive it to be possible to substantially modify the structure employed to carry out the objects of my invention without enlarging the scope or departing from the spirit thereof.

What I claim is:

1. A spring motor having a winding gear and a driving gear mounted on a common axis, a driven element operable by said driving gear, an adjustably supported electric motor capable of connection and disconnection at will relative to said winding gear, a switch intermediate of said winding gear and said driving gear, and devices for actuating said switch to open and close the motor circuit, respectively, upon the completion of a given number of revolutions of said winding gear and said driving gear, the number of revolutions of said winding gear necessary to operate said switch being in excess of the number of revolutions of said driving gear necessary to operate the switch.

2. In a camera actuating means having a spring motor and an electric motor, a driving gear connected with and operated by said spring motor, a driven element operable thereby and adapted to be connected with a camera, a winding gear connected with said spring motor, gearing connecting said winding gear with said electric motor, intermittently rotatable elements operable by said driving and winding gears, a switch for regulating the operation of said electric motor, and operating means connecting said switch with said rotatable elements for operating said switch to regulate the application of power to said winding gear.

3. In a camera actuating mechanism having an electric motor and a spring motor for operating a camera, a driving gear connected with said spring motor, driven gearing connecting said gear with said camera, winding gearing connecting said spring motor with said electric motor, intermittently rotatable elements actuated by said driving and winding gearing at predetermined intervals and for portions of a revolution at each operation, and a switch alternately actuated by said elements for starting and stopping the operation of said winding gears.

4. In a camera actuating mechanism having a spring motor and an electric motor for winding the same, driving gearing operated by said spring motor, winding gearing connecting said electric motor with said driving gearing, intermittently operable elements actuated by and at each revolution of said driving and winding gearing for a portion of a revolution at each operation, and a switch alternately actuated by said elements for opening and closing the electric motor circuit for regulating the winding of said spring motor.

5. In a camera actuating mechanism having a camera actuating spring motor provided with a driving gear and a winding gear, an electric motor connected with said winding gear, a pair of intermittently rotatable elements adapted to be rotated for a portion of a revolution at each revolution of said driving and winding gears, respectively, said winding gear element being operated twice for each operation of said driving gear element, and a switch selectively operable by manual effort and alternately by said elements for regulating the application of power to said winding gearing.

6. In a camera actuating mechanism, a spring motor for operating a camera, a driving gear and a winding gear connected therewith, driven gearing connecting said motor with said camera, an electric winding motor, friction gearing connecting said electric motor with said winding gear, independently rotatable elements actuated by said driving gear and said winding gear, said elements being intermittently operable at each revolution of said driving and winding gears, respectively, a switch alternately operable in reverse directions thereby and interposed in the electric motor circuit, and manual means for operating said switch, at will.

7. In a camera actuating mechanism including a mechanical and an electrical motor, gearing connecting said motors and a switch for regulating the operation of said electric motor, a pair of intermittently operable rotatable elements adapted to be actuated by said gearing at predetermined intervals, for alternately operating said switch, manual means for operating said switch, at will, and means for disconnecting said mechanical motor from said gearing.

Signed at Los Angeles, county of Los Angeles, and State of California, this 31 day of January, 1918.

HERBERT S. BECKMAN.

In the presence of—
D. P. KENDRICK,
LUTHER L. MACK.

Copies of this patent may be obtained for five cents each, by addressing the "Commissioner of Patents, Washington, D. C."